United States Patent
Zhao et al.

(10) Patent No.: US 10,909,041 B2
(45) Date of Patent: Feb. 2, 2021

(54) METHOD AND SYSTEM FOR MATCHING MULTI-DIMENSIONAL DATA UNITS IN ELECTRONIC INFORMATION SYSTEM

(71) Applicant: Beijing Jingdong Shangke Information Technology Co., Ltd., Beijing (CN)

(72) Inventors: Hui Zhao, Beijing (CN); Jing Wang, Beijing (CN); Peng Liu, Beijing (CN); Yanfeng Zhang, Beijing (CN)

(73) Assignee: Beijing Jingdong Shangke Information Technology Co., Ltd., Beijing (CN)

( * ) Notice: Subject to any disclaimer, the term of this patent is extended or adjusted under 35 U.S.C. 154(b) by 313 days.

(21) Appl. No.: 16/089,799

(22) PCT Filed: Jan. 6, 2017

(86) PCT No.: PCT/CN2017/070389
§ 371 (c)(1),
(2) Date: Sep. 28, 2018

(87) PCT Pub. No.: WO2017/166898
PCT Pub. Date: Oct. 5, 2017

(65) Prior Publication Data
US 2019/0146924 A1     May 16, 2019

(30) Foreign Application Priority Data
Mar. 28, 2016   (CN) .......................... 2016 1 0181703

(51) Int. Cl.
*G06F 12/0893*   (2016.01)
*G06Q 30/02*     (2012.01)
(Continued)

(52) U.S. Cl.
CPC ...... *G06F 12/0893* (2013.01); *G06F 12/0207* (2013.01); *G06F 12/0806* (2013.01);
(Continued)

(58) Field of Classification Search
CPC ............. G06F 12/0893; G06F 12/0806; G06F 12/0864; G06Q 30/02
(Continued)

(56) References Cited

U.S. PATENT DOCUMENTS

| 6,519,571 | B1 * | 2/2003 | Guheen ................. G06Q 30/02 705/14.66 |
| 2007/0226051 | A1 | 9/2007 | Addepalli |

(Continued)

FOREIGN PATENT DOCUMENTS

| CN | 101576918 A | 11/2009 |
| CN | 102447638 A | 5/2012 |

(Continued)

OTHER PUBLICATIONS

International Search Report in International Patent Application No. PCT/CN2017/070389, dated Apr. 7, 2017 (6 pages, w/English Translation).

(Continued)

*Primary Examiner* — Dung K Chau
(74) *Attorney, Agent, or Firm* — Nixon Peabody LLP (57) ABSTRACT

A method and system for matching multi-dimensional data units in an electronic information system, the method comprising: arranging interface modules and cache modules on a front-end processing device, and one interface module and two or more cache modules forming a matching module; performing service processing for at least two dimensions on a remote device, and writing a processed multi-dimensional data unit into the cache module of the front-end processing device; and after the interface module receives a user (Continued)

request, determining dimension information corresponding to a current scene of the user request, inquiring a matched multi-dimensional data unit in the catch module of the matching module according to the dimension information, and sending the multi-dimensional data unit obtained by the query to an output module. The method and the system are capable of improving the efficiency and real-time performance of matching a multi-dimensional information scene to a multi-dimensional data unit.

15 Claims, 3 Drawing Sheets

(51) Int. Cl.
*G06F 12/02* (2006.01)
*G06F 12/0806* (2016.01)
*G06F 12/0864* (2016.01)
*G06F 16/903* (2019.01)

(52) U.S. Cl.
CPC ......... *G06F 12/0864* (2013.01); *G06Q 30/02* (2013.01); *G06F 16/903* (2019.01)

(58) Field of Classification Search
USPC ........................................................ 707/736
See application file for complete search history.

(56) References Cited

U.S. PATENT DOCUMENTS

| 2010/0174601 | A1 | 7/2010 | Yu | |
|---|---|---|---|---|
| 2011/0219208 | A1* | 9/2011 | Asaad | ....................... G06F 9/06 712/12 |
| 2013/0073387 | A1* | 3/2013 | Heath | .................... G06Q 30/02 705/14.53 |
| 2013/0073400 | A1* | 3/2013 | Heath | .................... G06F 16/29 705/14.73 |
| 2016/0055518 | A1 | 2/2016 | Ahn | |

FOREIGN PATENT DOCUMENTS

| CN | 102598042 A | 7/2012 |
|---|---|---|
| CN | 103051564 A | 4/2013 |
| CN | 103716326 A | 4/2014 |
| CN | 104361505 A | 2/2015 |
| CN | 104951958 A | 9/2015 |
| CN | 105247554 A | 1/2016 |
| RU | 102413 U1 | 2/2011 |
| RU | 103948 U1 | 4/2011 |

OTHER PUBLICATIONS

Written Opinion in International Patent Application No. PCT/CN2017/070389, dated Apr. 7, 2017 (8 pages, w/English Translation).

* cited by examiner

METHOD AND SYSTEM FOR MATCHING MULTI-DIMENSIONAL DATA UNITS IN ELECTRONIC INFORMATION SYSTEM

CROSS-REFERENCE TO RELATED APPLICATIONS

This application is a U.S. National Stage of International Application Patent No. PCT/CN2017/070389, filed on Jan. 6, 2017, which claims priority to Chinese patent application No. 201610181703.8, filed on Mar. 28, 2016. Both of the aforementioned applications are incorporated herein by reference in their entireties.

TECHNICAL FIELD

The present disclosure relates to the field of network data processing technology, and specifically to a method and system for matching a multi-dimensional data unit in an electronic information system.

BACKGROUND

At present, as networking gains popularity, e-commerce systems based on intelligent devices (such as computers, smart phones, or tablet computers) and communication networks have rapidly developed, and online shopping and marketing through the Internet have increasingly become a trend. The e-commerce system is an information processing system that is mainly used for human-machine interaction with the users, receiving the users' instructions to generate corresponding service requests (service requests, such as browsing a merchandise page or placing an order), and data processing the subject matter information of the corresponding merchandises. In essence, the e-commerce system is an integrated electronic information system that collects, stores, and displays the merchandise information, and processes relevant transaction information.

With the rapid development of the e-commerce, the competition between the providers of the e-commerce systems is increasingly intense, and various types of e-coupon dispatching promotions have become a popular promotion approach. Setting selective merchandises below the market price to benefit the buyers is used as one of the means to increase the loyalty of regular users whilst attracting new users to join.

In essence, the e-coupon is a data unit in the e-commerce system. An e-coupon integrates a variety of data, and includes multi-dimensional information. For example, the multi-dimensional information specifically includes:

information in a use limitation dimension, such as whether the discount coupon is applicable after exceeding a set amount, or whether the discount coupon is unconditionally applicable;

information in a use range dimension, such as information regarding a group of merchants, whether the discount coupon is only for the merchant's own selected merchandises, or whether the discount coupon is for all of the merchant's own merchandises;

information in a use channel dimension, such as a personal computer (PC) channel, a mobile application (app) channel, and a specific application such as a WeChat channel;

information in a use region dimension, such as the information usable only for distribution to a specific region;

information in a user dimension, such as the user membership level information, and the user security level information; and information in a promotion state dimension, such as the entire period of the promotion, the time interval of daily promotion, and the number of coupon pools.

In the e-commerce system, when a user sends a service request, the system needs to automatically match one or more coupon data units for the user according to the current use scenario of the user. However, the relevant parameters of the use scenario in the e-commerce system are also multi-dimensional, such as the dimension information of the logged-in user, the geographical scope of the login, the information of the store currently being browsed, and the merchandise information. Therefore, in this data structure having complex relationships, it is very difficult to match the coupon data units available for a user according to the real-time scenario channel, the merchandise, and the user, and quickly push and display the coupon data units to the user through a specific output approach (output scenarios, such as the item page, the shopping cart, the favorites, and the follow us).

The existing technologies have an automatic approach for matching coupon data units, but this matching approach only matches the coupon data unit in a single dimension with the user information in a single dimension, has low matching efficiency and serious delay when matching the multi-dimensional coupon data units to multi-dimensional information scenarios, and fails to be implemented in essence.

SUMMARY

In view of this, a main goal of the present disclosure is to provide a method for matching multi-dimensional information in an electronic information system, to improve the efficiency and timeliness of matching multi-dimensional data units to multi-dimensional information scenarios.

Another goal of the present disclosure is to provide a system for matching multi-dimensional information in an electronic information system, to improve the efficiency and timeliness of matching multi-dimensional data units to multi-dimensional information scenarios.

The technical solution of the present disclosure is implemented by:

A method for matching a multi-dimensional data unit in an electronic information system includes:

arranging an interface module and cache modules on a front-end processing device, the interface module and two or more of the cache modules forming a matching module;

processing services in at least two dimensions on a remote device, and writing a processed multi-dimensional data unit into the cache modules of the front-end processing device; and determining, after receiving a user request by the interface module, dimension information corresponding to a current scenario of the user request, querying a matched multi-dimensional data unit in the cache modules of the matching module based on the dimension information, and sending the multi-dimensional data unit obtained by the querying to an output module.

In a preferred embodiment, the method further includes:

adding a matching module in the front-end processing device in response to a number of the user requests being greater than a specific threshold, the added matching module including at least one interface module and two or more cache modules, copying the multi-dimensional data unit in the original matching module to the cache modules in the added matching modules; and distributing and sending the user requests to the interface module of the added matching module according to a specified distribution method; and reducing a number of the added matching modules in response to the number of the user requests being reduced to below the specific threshold.

In a preferred embodiment, the processing services in at least two dimensions on a remote device includes:

splitting service modules on the remote device based on the dimensions and service categories. Each of the service modules processes a specific type of service. The each of the service modules outputs a data unit in a corresponding dimension, and writes the data unit into the cache modules of the front-end processing device.

In a preferred embodiment, the method further includes:

distributing the multi-dimensional data units uniformly in the two or more of the cache modules using a consistent hashing algorithm.

In a preferred embodiment, the electronic information system is an e-commerce system, and the multi-dimensional data unit is a coupon data unit in the e-commerce system.

A system for matching a multi-dimensional data unit in an electronic information system includes:

a matching module arranged on a front-end processing device and including an interface module and two or more cache modules; and a service module arranged on a remote device for processing services in at least two dimensions, and writing a processed multi-dimensional data unit into the cache modules of the front-end processing device.

The interface module is used for receiving a user request, determining dimension information corresponding to a current scenario of the user request, querying a matched multi-dimensional data unit in the cache modules of the matching module based on the dimension information, and sending the multi-dimensional data unit obtained by the querying to an output module.

In a preferred embodiment, the number of the matching modules is at least one. Matching modules are added when the number of the user requests is greater than the specific threshold. The multi-dimensional data unit in the original matching module is copied to the cache modules in the added matching modules; and the number of the added matching modules is reduced in response to the number of the user requests being reduced to below the specific threshold.

In a preferred embodiment, the remote device has at least two service modules, each of the service modules processes a specific type of service, each of the service modules outputs a data unit in a corresponding dimension, and writes the data unit into the cache modules of the front-end processing device.

In a preferred embodiment, the multi-dimensional data units in the two or more of the cache modules are uniformly distributed using a consistent hashing algorithm.

In a preferred embodiment, the electronic information system is an e-commerce system, and the multi-dimensional data unit is a coupon data unit in the e-commerce system.

Compared with the existing technologies, the present disclosure processes corresponding services based on at least two dimensions, and service categories, and pushes a processed multi-dimensional data unit in cache modules of a front-end processing device; an interface module of the front-end processing device directly determines dimension information of a current scenario when a user initiates a request, finds a matched multi-dimensional data unit in a local cache module, and quickly returns a finding result to the user, thereby improving the efficiency and timeliness of matching multi-dimensional data units to multi-dimensional information scenarios. The present disclosure further separates the service module from the interface module, enabling the interface module to be no longer mixed with the service module. The interface module can complete the querying locally, thereby reducing overhead of network. The data is stored in a plurality of cache modules, thereby ensuring access to the data in case of high concurrency.

The present disclosure is applied in a matching scenario of a coupon data unit of an e-commerce system, and can dynamically match available coupon data units to a current user scenario in real time based on a multi-dimensional comprehensive index, such as use range, user, channel, and promotion characteristic of coupons, in a mode of a considerable amount of access, thereby improving the efficiency and timeliness of matching multi-dimensional data units to multi-dimensional information scenarios.

DETAILED DESCRIPTION OF EMBODIMENTS

The present disclosure is further described in detail below in conjunction with the accompanying drawings and specific embodiments.

The electronic information system according to the disclosure particularly may be an e-commerce system. The multi-dimensional data unit particularly may be a coupon data unit in the e-commerce system. Of course, the method for matching a multi-dimensional data unit in an electronic information system according to the disclosure can also be applied to matching similar multi-dimensional data units in other similar electronic information systems.

Figure 1:
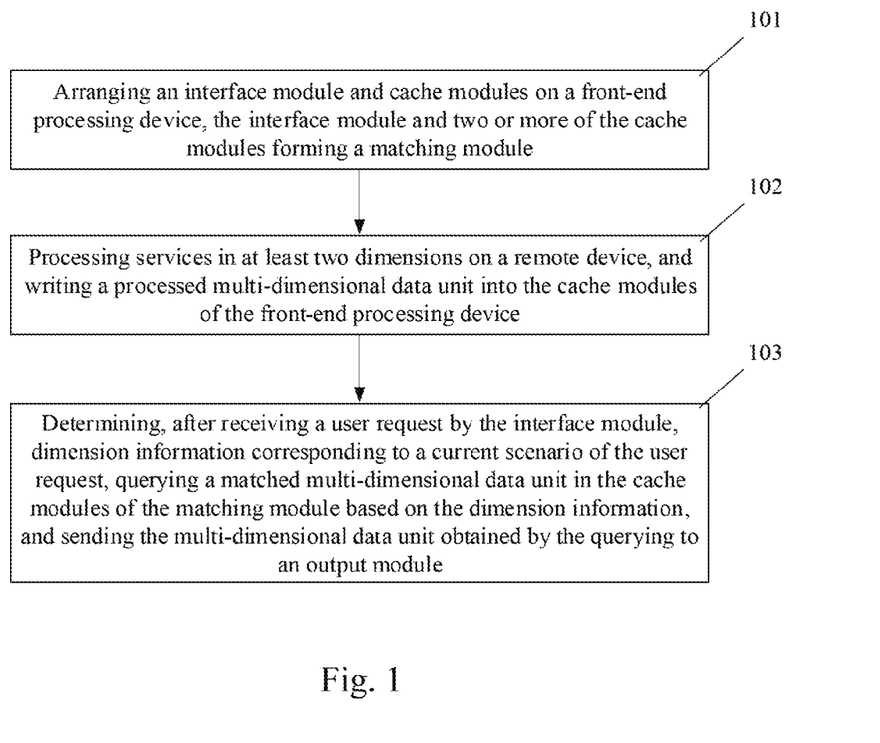
FIG. 1 is a schematic diagram of a process of a method for matching a multi-dimensional data unit in an electronic information system according to the disclosure.

FIG. 1 is a schematic diagram of a process of a method for matching a multi-dimensional data unit in an electronic information system according to the disclosure. By referring to FIG. 1, the method mainly includes:

Step 101: arranging an interface module and cache modules on a front-end processing device, the interface module and two or more of the cache modules forming a matching module.

Step 102: processing services in at least two dimensions on a remote device, and writing a processed multi-dimensional data unit into the cache modules of the front-end processing device.

Step 103: determining, after receiving a user request by the interface module, dimension information corresponding to a current scenario of the user request, querying a matched multi-dimensional data unit in the cache modules of the matching module based on the dimension information, and sending the multi-dimensional data unit obtained by the querying to an output module.

Figure 2:
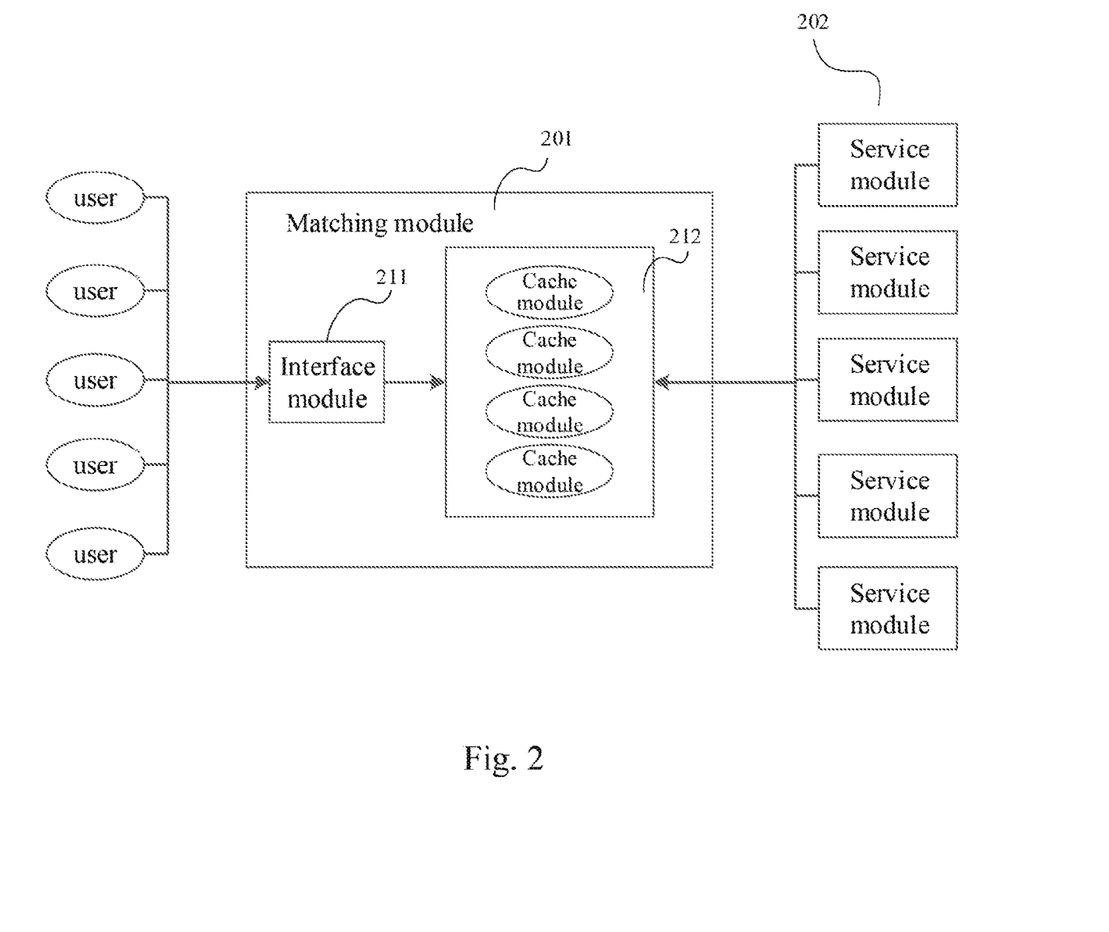
FIG. 2 shows a schematic diagram of a structure of a system for matching a multi-dimensional data unit in an electronic information system according to the disclosure.

Corresponding to the method according to the disclosure, the present disclosure further discloses a system for matching a multi-dimensional data unit in an electronic information system. FIG. 2 shows a schematic diagram of a structure of a system for matching a multi-dimensional data unit in an electronic information system according to the disclosure. By referring to FIG. 2, the matching system specifically may include:

A matching module 201 arranged on a front-end processing device and including an interface module 211 and two or more cache modules 212;

A service module 202 arranged on a remote device for processing services in at least two dimensions, and writing a processed multi-dimensional data unit into the cache modules 212 of the front-end processing device.

The interface module 211 is used for receiving a user request, determining dimension information corresponding to a current scenario of the user request, querying a matched multi-dimensional data unit in the cache modules 212 of the matching module based on the dimension information, and sending the multi-dimensional data unit obtained by the querying to an output module.

The output module may be, for example, a common audio-visual output device, such as a display, or a loudspeaker. The audio-visual output device is commonly used, and therefore the output module is not shown in FIG. 2.

In the present disclosure, for a website, the front-end processing device generally refers to a foreground part of the website, includes a presentation layer and a structural layer of the website, and is mainly used for processing front-end requests, and outputting and displaying information to users. The front-end processing device is usually a server. The remote device is remote to the front-end processing device, and generally refers to a back-end server of a website, which is usually used for executing functions, such as service processing, and data storage.

As mentioned above, the present disclosure processes corresponding services based on at least two dimensions and service categories, and pushes processed multi-dimensional data units into the cache modules of the front-end processing device. When a user initiates a request, the interface module of the front-end processing device directly determines dimension information of a current scenario, finds a matched multi-dimensional data unit in local cache modules, and quickly returns a finding result to the user, thereby improving the efficiency and timeliness of matching multi-dimensional data units to multi-dimensional information scenarios.

The present disclosure further separates the service module from the interface module, enabling the interface module to be no longer mixed with the service module. The interface module can complete the querying locally, thereby reducing overhead of network. The data is stored in a plurality of cache modules, thereby ensuring access to the data in case of high concurrency.

In particular, the present disclosure is applied in a scenario of matching a coupon data unit of an e-commerce system, gives a very good solution to matching the coupon data unit in a multi-dimensional complex mode of a specific scenario, solves a problem of dynamically matching a recommended coupon data unit in a multi-dimensional complex scenario in real time, can guarantee service stability and return speed in a context of a large data size, and can ensure the efficiency and timeliness of a complex query in case of a very considerable amount of access.

However, at present, the electronic information system is increasingly accessed. For example, the e-commerce system can be accessed more than ten million times, or even one hundred million times every day. With such a considerable amount of user access, a large number of the user requests are sent.

Figure 3:
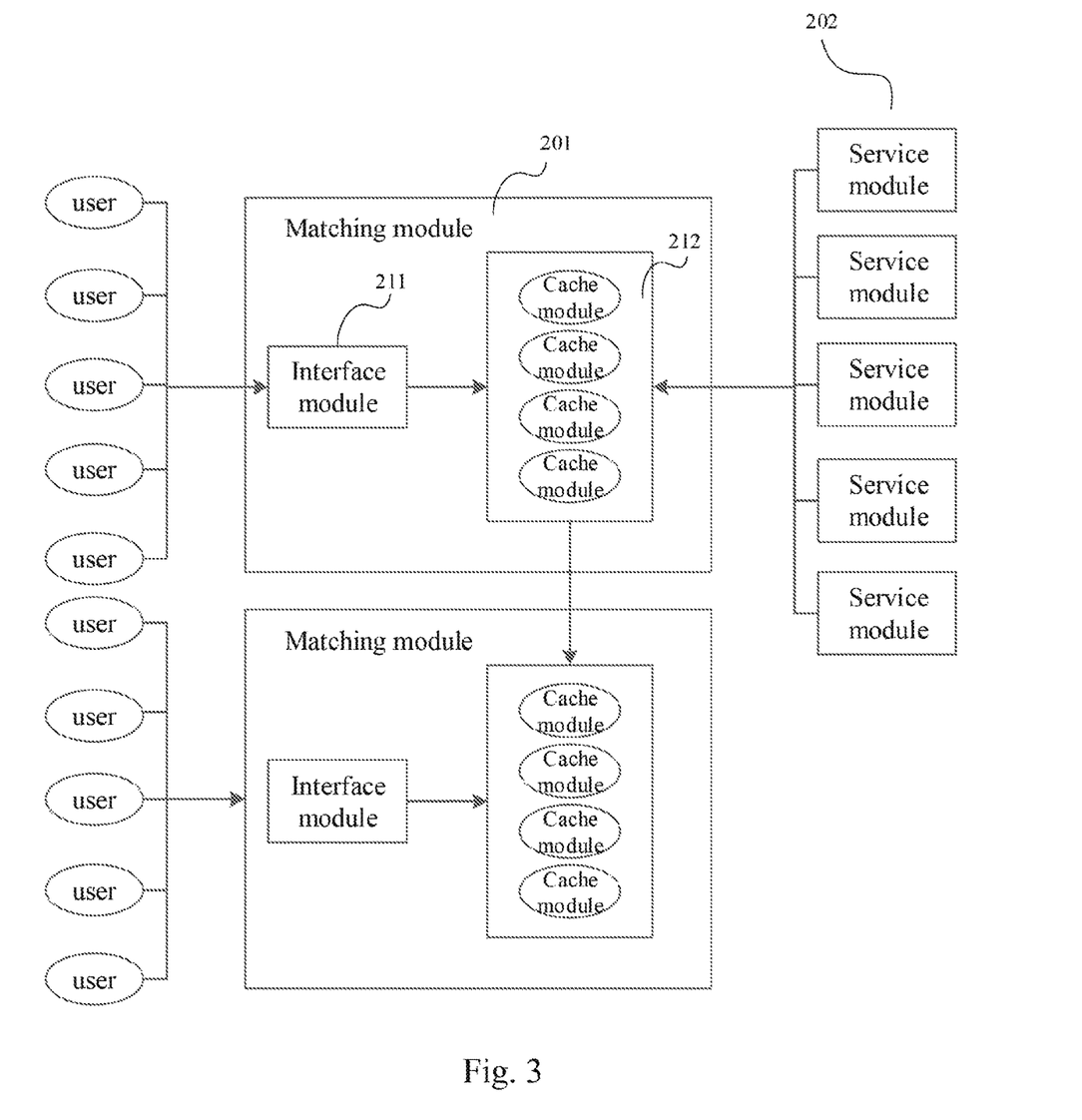
FIG. 3 shows a schematic diagram of another structure of a system for matching a multi-dimensional data unit in an electronic information system according to the disclosure.

Therefore, in a preferred embodiment of the present disclosure, matching modules can be further added in the front-end processing device if the number of the user requests are greater than a specific threshold, as shown in FIG. 3. The added matching modules include at least one interface module and two or more cache modules. The multi-dimensional data unit in the original matching module is copied to the cache modules in the added matching modules. After adding the matching modules, the user request can be distributed and sent to the interface module of the added matching modules according to a specified distribution method (e.g., a distributed method). The number of the added matching modules are reduced in response to the number of the user requests being reduced to below the specific threshold.

Corresponding to the method, in the matching system as shown in FIG. 3, the number of the matching modules is at least one. Matching modules are added when the number of the user requests is greater than the specific threshold. The multi-dimensional data unit in the original matching module is copied to the cache modules in the added matching modules; and the number of the added matching modules is reduced in response to the number of the user requests being reduced to below the specific threshold.

Thus, the matching modules according to the disclosure is a standardized unit capable of being added flexibly, and a unit design is realized. The present disclosure can quickly copy the matching module based on the number of the user requests, adds matching modules when the amount of user access is increased, and reduces the number of the matching modules when the user access is decreased.

In the present disclosure, the processing services in at least two dimensions on a remote device includes:

splitting service modules on the remote device based on the dimensions and service categories. Each of the service modules processes a specific type of service. The each of the service modules outputs a data unit in a corresponding dimension, and writes the data unit into the cache modules of the front-end processing device.

That is, as shown in FIG. 2 and FIG. 3, the matching system may have at least two service modules on the remote device. The each of the service modules only processes a specific type of service. If there is new change of the service, it is only necessary to add corresponding service modules. Each of the service modules outputs a data unit in a corresponding dimension, and writes the data unit into the cache modules of the front-end processing device.

The present disclosure is further described hereinafter taking an application scenario of matching a coupon data unit of the e-commerce system according to the disclosure as an example.

First, as for the service module, the service module mainly summarizes and classifies data based on dimensions, and service processing data, and writes the data into the cache modules for use by the interface module. In the scenario of matching the coupon data unit of the e-commerce system, the service module may include, for example, following kinds:

I. A coupon batch rule module, which is used for receiving messages from a message queue (MQ) of the e-commerce system, editing the coupon batch rule information based on addition messages, modification messages, deletion messages, etc., and writing the coupon batch rule information into the cache modules.

The coupon batch rule information is mainly divided into following major categories:

A. Coupon valid for buying specified three-level categories. To-be-cached coupon rule information is constructed according to the categories. The coupon batch rule information and following coupon batch rule information are a multi-dimensional data unit, including specific constraints on coupons. For example, the constraints here may be identifiers of the specified three-level categories.

B. Coupon valid for buying a stock keeping unit (sku) of specified merchandises in the specified three-level categories. The sku is an identifier of a smallest fine grit of merchandise. Then, the to-be-cached coupon rule information is constructed based on the categories and the sku, including the identifiers of the specified three-level categories and the sku of the specified merchandises.

C. Coupon valid for buying the specified three-level categories, but invalid for buying the sku of some merchandises. The to-be-cached coupon rule information is constructed based on the categories and the sku, including the identifiers of the specified three-level categories and the sku of unavailable merchandises.

D. Coupon valid for buying all merchandises of a store. The to-be-cached coupon rule information is constructed based on the store, including the identifiers of the store and the identifiers of all merchandises in the store.

E. Coupon valid for buying the sku of some merchandises of a store. The to-be-cached coupon rule information is constructed based on the store and the sku, including the identifiers of the store and the sku of specified merchandises.

II. A module of a state of a coupon having been obtained by users and a promotion state. There are many states of coupons having been obtained by users and promotion states, which are constantly changing in real time. It is slow to update cache states by a query approach. Therefore, in a preferred embodiment of the present disclosure, these states can be quickly acquired by subscribing redis messages. The state information is also a multi-dimensional data unit, specifically including: state information, such as promotion coupons having been obtained, current promotion coupons having been obtained, all promotion coupons having been completely issued, and current promotion coupons having been completely issued.

III. A user level query module. The user level information is also one item of the multi-dimensional data unit. A user level changes slowly. The user level obtained by querying is written into a cache module, and then validity duration of the user level is calculated. The user level will be invalid after the validity duration. After the user level becomes invalid, the user level information is re-queried, and re-written into the cache module, and then the validity duration is re-calculated, which are repeated. The coupon promotion is associated with the user level, and different promotions are limited to different user levels.

IV. A user risk grade query module. The user risk grade information is also one item of the multi-dimensional data unit. A user risk grade information changes fast. The user risk grade obtained by querying is written into a cache module, and then validity duration of the user risk grade is calculated. The user risk grade will be invalid after the validity duration. After the user risk grade becomes invalid, the user risk grade information is re-queried, and re-written into the cache module, and then the validity duration is re-calculated, which are repeated. The coupon promotion is associated with the user risk grade, and different promotions are limited to different user risk grades.

V. A to-be-bought merchandise attribute query module. The merchandise attribute is also a part of the multi-dimensional data unit, and may be, e.g., a type of coupon used for the merchandise, such as A coupon, or B coupon. A merchandise attribute changes slowly. The merchandise attribute obtained by querying is written into a cache module, and then validity duration of the merchandise attribute is calculated. The merchandise attribute will be invalid after the validity duration. After the merchandise attribute becomes invalid, the merchandise attribute information is re-queried, and re-written into the cache module, and then the validity duration is re-calculated, which are repeated. Each merchandise has a distinct attribute, the A coupon is valid for some merchandises, and the B coupon is valid for some other merchandises.

In the present disclosure, a cache module on the front-end processing device is used for storing a multi-dimensional data unit processed by the service module, to enable the interface module to acquire data. A large number of multi-dimensional data units can be stored in the cache module, to meet service needs. Because each cache module has specific accessibility, its performance will drop when the amount of access reaches a specific amount. Therefore, in a preferred embodiment of the present disclosure, two or more cache modules may be used to provide services to reduce the amount of access of each cache module, thereby improving the entire accessibility, as shown in FIG. 2 and FIG. 3. Moreover, a consistent hashing algorithm is used to distribute the multi-dimensional data units uniformly in each of the cache modules, to prevent one cache module from becoming a hotspot.

In the present disclosure, the user request received by the interface module refers to a request triggered for matching a multi-dimensional data unit sent by a user terminal. For example, for a coupon data unit in an e-commerce system, the user request may be, e.g., a request for accessing to a webpage of a merchandise. After receiving the user request, the interface module will first validate validity of the request, and then determine dimension information corresponding to the current scenario of the user request. For example, the interface module determines the level and the risk grade of the user sending the user request, the attribute information of currently accessed merchandise, queries the coupon data unit from the cache modules belonging to the same matching module as the interface module based on dimension information, finds out coupon data units matching the dimension information as candidate coupon data units, then determines a state of a coupon having been obtained by the user and a promotion state corresponding to the candidate coupons, then selects the coupon data units that have not been obtained by the user and have promotion coupons having not been completely issued, and outputs the coupon data units to the user through the output module. The outputted coupon data units are the coupons available for the current user in the current multi-dimensional scenario.

In addition, the functional modules according to the embodiments of the present disclosure may be integrated in a processing unit, or each module may separately physically exist, or two or more modules may be integrated in one unit. The integrated unit may be implemented in the form of hardware, or be implemented in the form of a software function unit. The functional modules of the embodiments may be located in one terminal or network node, or be distributed into a plurality of terminals or network nodes.

In addition, each embodiment of the present disclosure can be implemented by a data processing program executed by a data processing device, e.g., a computer. Obviously, the data processing program constitutes the present disclosure. Furthermore, the data processing program stored in a storage medium is usually executed by directly reading the program from the storage medium or by installing or copying the program to a storage device (such as at least one of a hard disk or an internal memory) of the data processing device. Therefore, such a storage medium also constitutes the present disclosure. Any type of recording approach may be used in the storage medium, such as a paper storage medium (such as a paper tape), a magnetic storage medium (such as a floppy disk, a hard disk, or a flash memory), an optical storage medium (such as a CD-ROM), or a magneto-optical storage medium (such as MO).

Therefore, the present disclosure further discloses a storage medium, storing a data processing program therein. The data processing program is used for executing any one of the embodiments of the method according to the disclosure.

Furthermore, steps of the method according to the disclosure may be implemented by a data processing program, or hardware, e.g., implemented by a logic gate, a switch, an application specific integrated circuit (ASIC), a programmable logic controller, and an embedded microcontroller. Therefore, the hardware that can implement the method according to the disclosure may also constitute the present disclosure.

The foregoing description is only preferred embodiments of the present disclosure, which are not intended to limit the present disclosure. Any modification, equivalent replacement, improvement, or the like made within the spirit and principle of the present disclosure should be included within the scope of protection of the present disclosure.

What is claimed is:

1. A method for matching a multi-dimensional data unit in an electronic information system, the method comprising:
   arranging an interface module and cache modules on a front-end processing device, the interface module and two or more of the cache modules forming a matching module;
   processing services in at least two dimensions on a remote device, and writing a processed multi-dimensional data unit into the cache modules of the front-end processing device; and
   determining, after receiving a user request by the interface module, dimension information corresponding to a current scenario of the user request, querying a matched multi-dimensional data unit in the cache modules of the matching module based on the dimension information, and sending the multi-dimensional data unit obtained by the querying to an output module.

2. The method according to claim 1, further comprising:
   adding a matching module in the front-end processing device in response to a number of the user requests being greater than a specific threshold, the added matching module including at least one interface module and two or more cache modules, copying the multi-dimensional data unit in an original matching module to the cache modules in the added matching modules;
   and distributing and sending the user requests to the interface module of the added matching module according to a specified distribution method; and
   reducing a number of the added matching modules in response to the number of the user requests being reduced to below the specific threshold.

3. The method according to claim 1, wherein the processing services in at least two dimensions on a remote device comprises:
   splitting service modules on the remote device based on the dimensions and service categories, each of the service modules processing a specific type of service, the each of the service modules outputting a data unit in a corresponding dimension, and writing the data unit into the cache modules of the front-end processing device.

4. The method according to claim 1, further comprising:
   distributing the multi-dimensional data units uniformly in the two or more of the cache modules using a consistent hashing algorithm.

5. The method according to claim 1, wherein the electronic information system is an e-commerce system, and the multi-dimensional data unit is a coupon data unit in the e-commerce system.

6. A system for matching a multi-dimensional data unit in an electronic information system, comprising:
   at least one processor; and
   a memory storing instructions, the instructions when executed by the at least one processor, cause the at least one processor to perform operations, the operations comprising:
      arranging an interface module and cache modules on a front-end processing device, the interface module and two or more of the cache modules forming a matching module;
      processing services in at least two dimensions on a remote device, and writing a processed multi-dimensional data unit into the cache modules of the front-end processing device; and
      determining, after receiving a user request by the interface module, dimension information corresponding to a current scenario of the user request, querying a matched multi-dimensional data unit in the cache modules of the matching module based on the dimension information, and sending the multi-dimensional data unit obtained by the querying to an output module.

7. The system according to claim 6, wherein the operations further comprise:
   adding a matching module in the front-end processing device in response to a number of the user requests being greater than a specific threshold, the added matching module including at least one interface module and two or more cache modules, copying the multi-dimensional data unit in an original matching module to the cache modules in the added matching modules; and distributing and sending the user requests to the interface module of the added matching module according to a specified distribution method; and
   reducing a number of the added matching modules in response to the number of the user requests being reduced to below the specific threshold.

8. The system according to claim 6, wherein the processing services in at least two dimensions on a remote device comprises:
   splitting service modules on the remote device based on the dimensions and service categories, each of the service modules processing a specific type of service, the each of the service modules outputting a data unit in a corresponding dimension, and writing the data unit into the cache modules of the front-end processing device.

9. The system according to claim 6, wherein the operations further comprise:
   distributing the multi-dimensional data units uniformly in the two or more of the cache modules using a consistent hashing algorithm.

10. The system according to claim 6, wherein the electronic information system is an e-commerce system, and the multi-dimensional data unit is a coupon data unit in the e-commerce system.

11. A non-transitory computer-readable storage medium storing a computer program, the computer program when executed by one or more processors, causes the one or more processors to perform operations, the operations comprising:

arranging an interface module and cache modules on a front-end processing device, the interface module and two or more of the cache modules forming a matching module;

processing services in at least two dimensions on a remote device, and writing a processed multi-dimensional data unit into the cache modules of the front-end processing device; and determining, after receiving a user request by the interface module, dimension information corresponding to a current scenario of the user request, querying a matched multi-dimensional data unit in the cache modules of the matching module based on the dimension information, and sending the multi-dimensional data unit obtained by the querying to an output module.

12. The non-transitory computer-readable storage medium according to claim 11, wherein the operations further comprise:

adding a matching module in the front-end processing device in response to a number of the user requests being greater than a specific threshold, the added matching module including at least one interface module and two or more cache modules, copying the multi-dimensional data unit in an original matching module to the cache modules in the added matching modules; and distributing and sending the user requests to the interface module of the added matching module according to a specified distribution method; and reducing a number of the added matching modules in response to the number of the user requests being reduced to below the specific threshold.

13. The non-transitory computer-readable storage medium according to claim 11, wherein the processing services in at least two dimensions on a remote device comprises:

splitting service modules on the remote device based on the dimensions and service categories, each of the service modules processing a specific type of service, the each of the service modules outputting a data unit in a corresponding dimension, and writing the data unit into the cache modules of the front-end processing device.

14. The non-transitory computer-readable storage medium according to claim 11, wherein the operations further comprise:

distributing the multi-dimensional data units uniformly in the two or more of the cache modules using a consistent hashing algorithm.

15. The non-transitory computer-readable storage medium according to claim 11, wherein the electronic information system is an e-commerce system, and the multi-dimensional data unit is a coupon data unit in the e-commerce system.

* * * * *